INVENTORS:
DONALD R. ALBRIGHT,
ALLAN C. SHARTRAND,
ALBERT J. OTTESON,
BY Robert J. Bird
THEIR ATTORNEY.

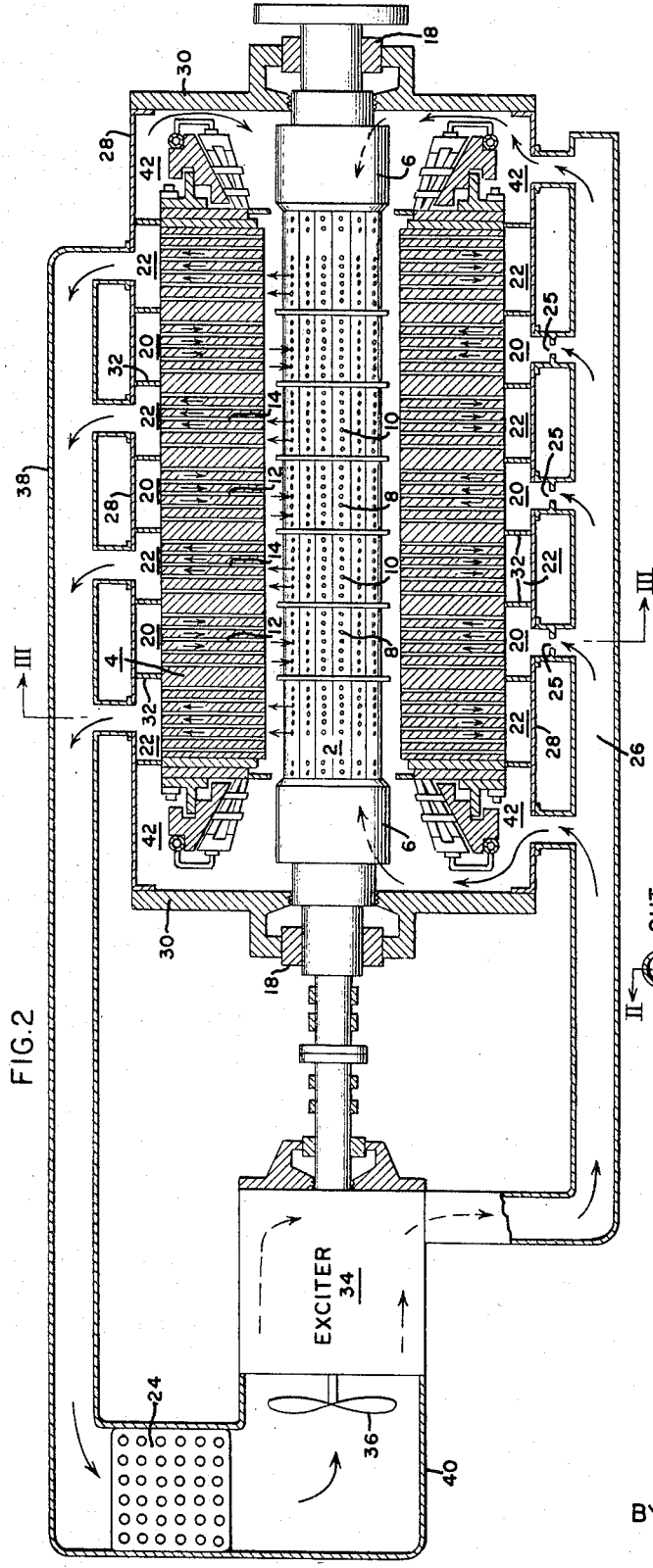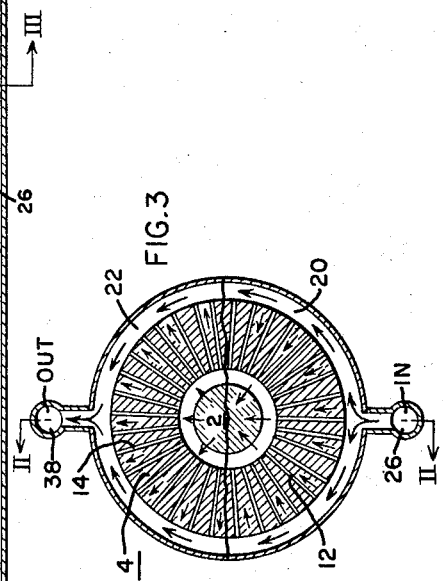

United States Patent Office 3,441,758
Patented Apr. 29, 1969

3,441,758
DYNAMOELECTRIC MACHINE COOLING
ARRANGEMENT
Donald R. Albright, Allan C. Shartrand, and Albert J.
Otteson, Scotia, N.Y., assignors to General Electric
Company, a corporation of New York
Filed Feb. 3, 1967, Ser. No. 613,871
Int. Cl. H02k 9/14
U.S. Cl. 310—58                                     4 Claims

ABSTRACT OF THE DISCLOSURE

Gap-pickup dynamoelectric machine with shortened bearing span and reduced casing diameter made possible by having fans and part of cooling gas circuit external to casing said circuit is externally connected by conduits communicating through wrapper plate at a plurality of axially spaced locations.

Background of the invention

The present invention is related to dynamoelectric machine cooling. More particularly, the invention has to do with gas cooling of the rotor and stator of a dynamoelectric machine.

In large dynamoelectric machines of the prior art, for example, large turbine-generators, cooling of the windings in the rotor and in the stator is commonly accomplished by means of a circulating pressurized gas such as hydrogen within the generator casing. Typical of generator cooling arrangements using hydrogen gas is one in which the rotor is of the "gap-pickup" type in which the rotor has, along its length, alternate zones of inlet and outlet passages communicating with the "air gap" between the rotor and the stator. These inlet and outlet passages scoop the coolant gas from the air gap to the rotor interior and discharge the coolant gas from the rotor interior to the air gap. The generator stator core likewise has alternate zones of radially directed gas ducts or passages which are in axial correspondence with the respective zones on the rotor so that hydrogen gas discharged from the rotor continues to move radially through these ducts in the stator. Similarly, hydrogen gas flowing radially inwardly in the stator ducts is scooped into corresponding rotor inlet passages. Upon being discharged from the rotor and from the stator through the aforementioned radial passages, the coolant gas flows into annular manifolds surrounding the core. These numerous and separate manifolds communicate with one another so as to form a common coolant gas conduit from which the gas flows through heat exchangers for the purpose of cooling the gas. From these heat exchangers or hydrogen coolers, the gas continues to flow to the suction side of the generator fans, one of which is mounted within the casing on each end of the rotor shaft. From the generator fans, the hydrogen is discharged axially into the air gap and into a common manifold surrounding the generator and communicating with separate manifolds which in turn communicate with the radial inlet passages in the stator core.

FIG. 1 is a sectional elevation view of a generator typical of the prior art showing the coolant gas flow patterns above described. FIG. 1 also clearly shows that the entire coolant flow circuit is contained within the wrapper plate or outer casing of the generator. Furthermore, the axial flow fans on each end of the rotor shaft are contained within the generator casing and are located within the bearing span. The minimum length of such a generator is a length between bearings within the casing as will accommodate an axial flow fan on each end as well as a suitable volume on each side of the fan for suction and discharge. The minimum width or diameter of such a generator is such as will accommodate the coolant gas circuits including the gas coolers and the hot and cold gas manifolds.

One of the limiting factors of prior art generators at the present time is the factor of physical size. The width and height dimensions that these generators are approaching or have arrived at are the maximum size which a railroad flat car can accommodate. In order to achieve machines of higher ratings, it will be necessary either to increase the current loading on a given size generator, or to increase the size of the current carrying components in the machine without increasing its overall dimensions.

Another limiting factor in prior art generators is the consideration of the length of the bearing span. It would be desirable to shorten the span between bearings of the generator rotor so as to improve its rotational and vibrational characteristics.

It is an object of the present invention to provide a dynamoelectric machine of a given rating having a casing of smaller overall dimensions than comparable machines of the prior art.

Another object of the present invention is to provide a dynamoelectric machine of a given rating having a shorter bearing span than comparable machines of the prior art.

Another object is to provide a dynamoelectric machine cooling system which can be easily modified or controlled from outside the machine to balance coolant flows.

Another object is to provide a dynamoelectric machine having an improved capacity over comparable size machines of the prior art.

Another object is to provide a generator-exciter combination which is cooled by a common cooling system.

These and other objects, advantages and features of the present invention will become apparent from the following description of one embodiment thereof when taken in connection with the accompanying drawing.

Summary of the invention

Briefly stated, the present invention is practiced in one form by a radial flow gas cooled generator having a plurality of coolant gas manifolds therearound. The generator casing encloses the stator, rotor, and manifolds. The remainder of the coolant gas circuit, including gas coolers, fans, and supply and return headers, is external to the generator casing. This results in smaller overall generator dimensions including bearing span and casing diameter.

Drawing

FIG. 1, as above mentioned, is a vertical sectional view of a generator typical of the prior art.

FIG. 2 is a vertical sectional view of a generator according to the present invention.

FIG. 3 is a somewhat schematic view taken along the lines III—III of FIG. 2.

Description of the preferred equipment

Figure 1:
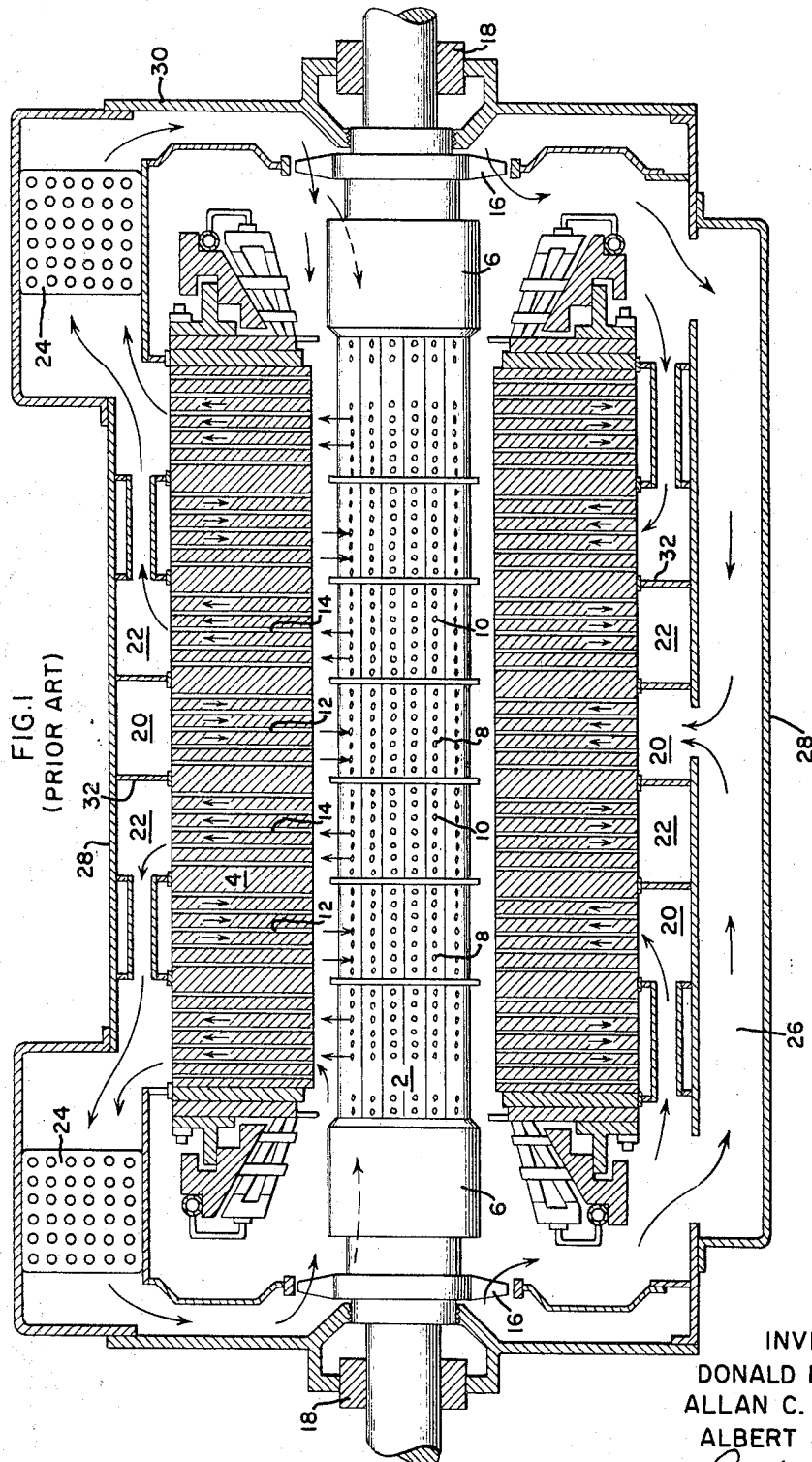

Referring now to FIGS. 1 and 2, wherein like numbers designate common components, a generator rotor 2 is shown rotatably disposed within generator stator 4. Rotor 2 has a retaining ring 6 mounted over each of its ends in order to hold in the rotor windings at their end turn portions. Axially spaced along the rotor 2 in discrete groups, are gap pickup holes 8 and gap discharge holes 10. These groups or zones of pickup and discharge holes are in substantial axial correspondence with similar groups or zones in the stator 4. That is, stator inlet passages 12 are in substantial axial correspondence with rotor gap pickup holes 8, and stator outlet passages 14 are in substantial axial correspondence with rotor gap discharge holes 10. The armature bars in stator 4 are cooled additionally by the passage of liquid longitudinally therethrough. This liquid cooling of stator bars is known to the prior art and is not a part of the present invention.

Referring now to FIG. 1, which is a representation of a prior art generator, the rotor 2 also includes an axial discharge fan 16 on each end of the rotor shaft inboard of the rotor shaft bearings 18. The fans 16 are mounted inboard of the bearings 18 by a distance sufficient to permit the fans to take suction from their outboard sides.

Still referring to the prior art generator in FIG. 1, the stator inlet and outlet passages 12 and 14 communicate respectively with inlet and outlet manifolds 20 and 22 which are axially spaced along the stator to correspond with the inlet and outlet zones of the rotor and stator. The inlet manifolds 20 are in common communication as are the outlet manifolds 22. Between the outlet manifolds 22 and inlet manifolds 20, the coolant gas circuit includes gas coolers 24 and the rotor fans 16, all of which are connected in series by suitable gas flow passages or conduits within the generator casing. On the discharge side of the generator fans 16 is a coolant gas supply header 26 which leads to and communicates in common with the inlet manifolds 20. As is clear from the drawings in FIG. 1, the generator casing or wrapper plate 28 surrounds all of the aforementioned manifolds 20 and 22, coolers 24 and header 26, as well as including the generator fans within the bearing span. In other words, the generator casing or wrapper plate functions not only as a structural support for the stator core 4 but also to define spaces or chambers for the passage of coolant gas. Generators of this design are approaching limiting sizes both as to casing diameters and as to bearing spans. It would thus be desirable, to achieve larger generator ratings, to obviate the function of the generator casing as an axial gas circuit enclosure. This, then, is another object of the present invention.

Referring now specifically to FIG. 2, the generator including the rotor and stator are enclosed in a wrapper plate 28 and outer end shield 30. The wrapper plate 28 supports the stator core 4 by means of radially extending section plates 32. The end shields 30 support the rotor bearings 18 which in turn support the generator rotor 2 at points substantially adjacent the retaining rings 6, and outboard thereof. That is, the bearings 18 are immediately outboard the rotor windings with no rotor fans therebetween. Thus, the largest overall dimensions of the generator proper are only such as required by structural and mounting considerations. That is, the diameter of the generator wrapper plate is determined by requirements of the section plates 32 which support the stator core. Also, the length between bearings 18 is only such as is required to support the rotor at points immediately outboard its retaining rings, without extra axial space provision for fans.

External to the generator proper as shown in FIG. 2, is an exciter 34, connected in tandem with the generator, and fans 36, also connected in tandem with the generator and exciter. Fan 36 may be a single or multiple stage axial discharge fan, or it may be a radial or centrifugal type blower. To suit the requirements of a particular generator, the fan may be a high flow-low pressure or a low flow-high pressure type. On the suction side of fan 36 is a gas cooler 24 which in turn receives gas coolant from a gas return header 38 which communicates in common with the various outlet manifolds 22 by means of axially spaced conduits. A supply header 26 likewise communicates in common with the various inlet manifolds 20 by means of axially spaced conduits. Return header 38, cooler 24, fan 36, exciter 34, and supply header 26 are series-connected in a closed circuit by means of a conduit such as 40. The cooling gas circuit also includes annular spaces 42 communicating with the supply header 26 and with the rotor end windings to cool the same. In the conduits between supply header 26 and inlet manifolds 20, flow control devices such as valves or orifices 25 may be put to control the flows in the various paths for improved balance in the system.

Since the major portion of the above-described coolant gas circuit is external to the generator, it is intended that the exciter 34 be gas cooled by the same cooling system thus permitting a smaller sized exciter without the addition of a separate cooling system therefor.

To summarize the operation of the generator of this invention, and referring to FIGS. 2 and 3, when the machine is running, coolant gas is discharged from fan 36, over exciter 34 and into supply header 26. From supply header 26 the gas flows through axially spaced conduits into annular inlet manifolds 20 and radially inward through the stator core passages 12 and rotor passages 8. The gas also enters the generator casing in the rotor end winding region from annular spaces 42. From the rotor, the gas is discharged through rotor discharge passages 10 and through stator outlet passages 14 to outlet manifolds 22. Manifolds 22 communicate with the axially spaced conduits along the outside of the wrapper plate leading to return header 38 which directs the gas to cooler 24 and back to fan 36.

It will be apparent that a generator has herein been described which has an effective cooling system while permitting the generator proper to be of smaller overall dimensions for a given rating. The gas headers 26 and 38, for which provision was made in the interior of prior art generator casing, have been removed from the interior of the generator according to this invention. This has permitted a smaller diameter casing. Similarly, the removal of generator fans from inside the generator casing has permitted a shortening of the bearing span with consequent improvement of the rotational vibrational characteristics of the rotor.

It may occur to others of ordinary skill in the art to make modifications of the present invention which will remain within the concept and scope thereof and will not constitute a departure therefrom. Accordingly, it is intended that the invention be not limited by the details in which it has been described but that it encompass all within the purview of the following claims.

What is claimed is:

1. A dynamoelectric machine comprising a rotor and a stator of the radial coolant flow type in which coolant gas moves radially inward through inlet passages in the stator, across the air-gap separating the stator from the rotor, and into the rotor, from which it emerges and flows radially outward across the air-gap and through outlet passages in the stator, said rotor and stator inlet and outlet passages being spaced in alternate and corresponding zones along the length of said rotor and said stator, such dynamoelectric machine being known to the prior art and characterized by the following improvement:

said dynamoelectric machine being enclosed in a casing comprising a wrapper plate and a pair of end shields, a plurality of axially spaced section plates extending radially in supporting relationship between said wrapper plates and the core of said stator and defining therewith a plurality of annular inlet and outlet manifolds communicating respectively with said stator inlet and outlet passages, said end shields supporting rotor bearings which in turn support said rotor at points immediately outboard of the windings of said rotor, a coolant-gas closed circuit external to the support structure and the wrapper plates of the machine and operatively connected to said stator inlet and outlet manifolds at a plurality of axially spaced locations by conduits communicating through the wrapper plates.

2. The improvement according to claim 1 in which: said external closed circuit comprises a return header communicating with said outlet manifolds by axially spaced conduits, a supply header communicating with said inlet manifolds by axially spaced conduits, a gas cooler, and means to motivate the coolant gas within the circiut in the direction from said supply header.

3. The improvement according to claim 2 in which: an exciter means is operatively connected to said dynamoelectric machine and is disposed within said coolant gas circuit.

4. The improvement according to claim 2 further including flow control means in said coolant-gas circuit.

References Cited

UNITED STATES PATENTS 3,265,912  8/1966  Baudry _____ 310—59

FOREIGN PATENTS 243,069  1/1963  Australia.

WARREN E. RAY, *Primary Examiner.*

R. SKUDY, *Assistant Examiner.*

U.S. Cl. X.R.

310—64